June 15, 1965    E. E. SCHAEFER    3,189,308
FISHING REEL DISPLAYER
Filed July 9, 1962
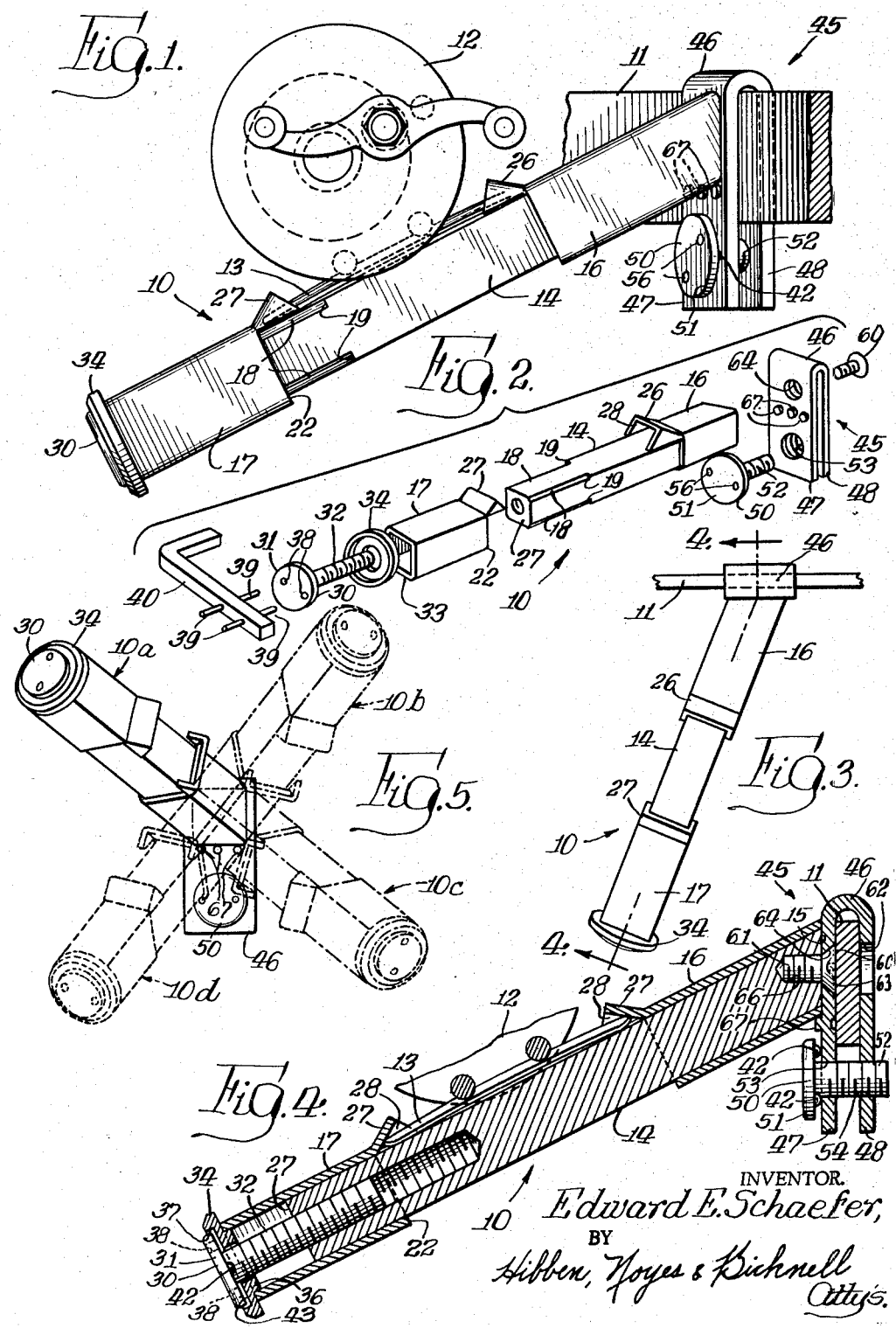
INVENTOR.
Edward E. Schaefer,
BY
Hibben, Noyes & Bicknell
Atty's.

United States Patent Office 3,189,308
Patented June 15, 1965

3,189,308
FISHING REEL DISPLAYER
Edward E. Schaefer, 1534 Park Ave., River Forest, Ill.
Filed July 9, 1962, Ser. No. 208,266
6 Claims. (Cl. 248—214)

This invention relates to a display device, and more particularly to a fishing reel displayer.

Accordingly, it is a general object of the present invention to provide a novel and improved fishing reel displayer.

A more particular object is to provide a novel fishing reel displayer that is adapted to display to advantage a variety of types and sizes of fishing reels in a realistic and attractive manner.

A further object is to provide a fishing reel displayer of the foregoing character which is adapted to discourage casual theft of a reel being displayed thereon.

Still another object is to provide a novel fishing reel displayer that is simple in construction, easy to operate, and economical to manufacture.

Other objects and advantages will be apparent from the following detailed description and accompanying drawing, in which:

FIGURE 1 is a perspective view of the fishing reel displayer embodying the features of the present invention;

FIGURE 2 is an exploded perspective of the fishing reel displayer of FIGURE 1;

FIGURE 3 is a reduced scale top plan view of the displayer;

FIGURE 4 is a somewhat enlarged sectional view of the displayer taken along the line 4—4 of FIGURE 3; and FIGURE 5 is a front elevational view of the displayer and illustrating in full and dotted lines the various operating positions of the displayer;

In FIG. 1, a fishing reel displayer embodying the features of the present invention is illustrated and indicated generally at 10. The displayer 10 is adapted to be mounted on a display surface which, in this instance, comprises a horizontally extending bar 11. It will be understood that the displayer 10 may also be modified to permit mounting on other types of display surfaces, such as a perforated board, counter top, or the like, without departing from the scope of the invention.

A fishing reel, indicated at 12, and having a base plate 13, is shown mounted on the displayer 10. The reel 12, comprising in this instance a drum-type bait casting reel, is illustrated by way of example only, inasmuch as the displayer 10 is adapted to display a wide range of reels in various positions.

Referring now to FIGS. 2–4 in conjunction with FIG. 1, the fishing reel displayer 10 comprises an elongated support or bar 14 having an engaging end face 15, the bar in this instance being rectangular in cross section and preferably square. It will be understood that the bar 14 could be made in other cross sections if desired.

Mounted on the bar 14 are a pair of tubular clamping members 16 and 17, the member 16 in this instance being fixed with respect to the bar 14 and disposed at the inner or right end thereof, as viewed in FIGS. 1 and 2, the member 17 being disposed at the outer or left end of the bar. The members 16 and 17 have internal cross sectional configurations complemental to that of the bar 14 so that they will maintain a fixed angular position with respect to the longitudinal axis of the bar 14 when mounted thereon.

In order to limit relative movement of the member 17 toward the inner end of the bar 14, the longitudinal corner edges of the bar 14 are beveled, as at 18, for a portion of the length of the bar to define shoulders 19 against which the corner edges, indicated at 22, of the member 17 bears. The shoulders 19 are disposed inwardly of the outer end, indicated at 27, of the bar 14 so that the member 17 has a substantial range of movement on the bar before contacting the shoulders 19.

For removably receiving and retaining a reel, such as the reel 12, for display purposes, the members 16 and 17 are provided with clamping means in the form of opposed jaws 26 and 27, respectively. In the present instance, the jaws 26 and 27 are formed from a portion of the material of the members 16 and 17 which is bent away from the surface of the bar 14 at one side thereof to define a pocket 28 (FIG. 4). The pockets 28 are adapted to receive the ends of the reel base plate 13 and to clamp the base plate to the support bar 14 in the manner illustrated in FIGS. 1 and 4 when the member 17 is moved toward the number 16.

For effecting adjustment of the position of the member 17 on the bar 14 to accommodate reels having different sizes of base plates 13 and to secure a reel to the bar 14, novel pilfer-proof adjusting means is provided. As best seen in FIGS. 2 and 4, such adjusting means comprises a screw 30 having an enlarged head 31 and elongated shank 32 threaded longitudinally into the end of the bar. In order to provide a bearing surface between the head 31 and the outer end edge, indicated 33, of the member 17, a washer-like member 34 is provided. The member 34 has a rectangular-shaped pilot portion 36 formed on its inner side face for insertion into the open end of the member 17, and the outer face of the member 34 is recessed, as at 37, to receive the head 31. When the head 31 is disposed in the recess 37, casual manipulation thereof to loosen the member 17 and thus the reel 12 is prevented. Consequently, the mounting of the reel 12 on the displayer 10 is substantially pilfer-proof.

In order to facilitate intentional loosening or tightening of the screw 30 to permit installation or removal of a different reel on the support 14, the head 31 is provided with a pair of diametrically spaced longitudinally extending openings 38 therethrough. The openings 38 are adapted to receive a pair of prongs 39 (FIG. 2) carried on an associated tool 40 for manipulating the screw. To this end, the under surface of the screw head 31 may be provided with at least one upraised portion 42, for engaging the inner wall, indicated at 43, of the member 31 to maintain the head 31 spaced from the wall 43 to accommodate inward projection of the prongs 39. In the present instance, three equidistantly spaced portions 42 are provided, such portions also facilitating removal of the screw 30.

Because the displayer 10 is intended to display various types of reels which may normally be mounted on top of, underneath, or on either side of a pole, it is desirable to permit the support 14 to be rotated relative to its display surface so that each reel may be displayed in a life-like and attractive manner. To this end, the displayer 10 includes connecting means indicated generally at 45, for adjustably and releasably securing the support 14 to the bar 11 in a plurality of angular positions.

The connecting means 45 thus comprises a U-shaped bracket 46 (FIGS. 1 and 4) having spaced legs 47 and 48 adapted to straddle the bar 11. A screw 50 having an enlarged head 51 and a threaded shank 52 is provided for releasably securing the bracket 46 to the bar 11. In the present instance, the shank 52 extends through an opening 53 in the leg 47 and is threaded into an opening 54 in the leg 48 so that the head 51 is accessible from the front of the bracket.

In order to prevent casual loosening or removal of the screw 50 from the bracket 46, the head 51 is formed in the manner of the screw head 31. Thus, the head 51 is provided with a pair of diametrically spaced openings 56 therethrough for receiving the prongs 39 of the associated tool 40. Without the tool 40, casual removal of the screw 50, and consequently removal of the bracket 46, is prevented. The undersurface of the screw head 51 may be provided with upraised portions 42 in the manner of the screw 30.

The bar 14 is adjustably connected to the bracket 46 by means of a screw 60 having a shank 61 threaded into the end face 15 of the bar. To this end, the leg 48 is provided with an opening 62 to accommodate the enlarged head, indicated at 63, of the screw 60, and the leg 47 is provided with a tapered opening 64 against which the undersurface of the head 63 seats.

As will be apparent from FIGS. 1 and 3, the inner end face 15 of the bar 14 is inclined with respect to at least one and preferably two of the flat longitudinal side faces of the bar 14 so that when the screw 60 is drawn up, the bar 14 will extend obliquely with respect to the surface of the leg 47. Such relationship permits the bar 14 to be mounted in a plurality of angular positions about an axis perpendicular to the end face 15 and through the screw 60. It is desirable however to provide means for indexing the bar 14 in a selected one of a plurality of angular positions and to maintain the bar thus indexed for display purposes.

To this end, the outer surface of the leg 47 is provided with abutment means in the form of a plurality of upraised projections or detents 67 which are adapted to engage the outer surfaces of the member 16 in the manner indicated in FIG. 4 to prevent rotation of the bar 14. Because the bar 14 and member 16 in this instance are square in cross section, the former may be pivoted about the perpendicular axis through the screw 60 upon a loosening of the latter, and thereafter secured in any one of four angular positions with respect to the bracket 46. The four positions of the displayer 10 are indicated in full and dotted lines in FIG. 5 and identified as 10a–10d, beginning with the full line position of the displayer and continuing in a clockwise direction. The bar 14 of the displayer 10 may thus be mounted in any one of the positions illustrated in FIG. 5 to provide the most realistic and/or attractive appearance to a reel to be displayed thereon. Similarly, the members 16 and 17 may be arranged on the bar so that the jaws 27 are disposed on the appropriate side of the bar for the desired orientation of the reel.

While only one embodiment of the invention has been herein illustrated and described, it will be understood that modifications and variations thereof may be effected without departing from the scope of the invention as set forth in the appended claims.

I claim:

1. A displayer for fishing reels, or the like, comprising an elongated support having at least one longitudinal side face and an end face inclined with respect to said side face, a pair of relatively shiftable members carried by said support, said shiftable members having clamping means adapted to engage and retain the base plate of a fishing reel therebetween, and connecting means at one end of said support for adjustably securing the latter in a selected one of a plurality of angular positions to a display surface, said inclined end face coacting with said connecting means so that support extends obliquely with respect to said connecting means.

2. A fishing reel displayer according to claim 1, further characterized in that said connecting means comprises a member adapted to be secured to said display surface, means releasably securing said one end of said support to said member, and means carried by said member adjacent said one end of said support for indexing the latter in said selected one of a plurality of angular positions relative to said member.

3. A displayer for fishing reels, or the like, comprising an elongated bar having a rectangular cross section, a pair of tubular members, rectangular in cross section, mounted on said bar, said tubular members having opposed jaws on a side face thereof adapted to engage and retain the base plate of a fishing reel therebetween, means at one end of said bar for adjusting the position of one of said tubular members relative to the other, and connecting means at the other end of said bar for adjustably securing the latter in a selected one of a plurality of angular positions to a display surface.

4. A fishing reel displayer according to claim 3, further characterized in that said means for adjusting said one tubular member comprises a screw threaded into the end of said bar and having an enlarged head, said head having at least one longitudinal opening therethrough adapted to receive a complementally shaped portion of a tool to facilitate adjustment of said tubular member.

5. A fishing reel displayer according to claim 4, further characterized in that a bearing member is interposed between said tubular member and said screw head, said bearing member having a recessed end face for receiving the enlarged head of said screw, and the undersurface of said head being provided with at least one upraised portion to accommodate the complementally shaped portion of said tool.

6. A displayer for fishing reels, or the like, comprising an elongated support, a pair of relatively shiftable members carried by said support, said shiftable members having clamping means adapted to engage and retain the base plate of a fishing reel therebetween, and connecting means at one end of said support including a bracket adapted to be secured to said display surface and having an abutment thereon, and means releasably securing said one end of said support to said bracket, said abutment being adapted to engage one of said relatively shiftable members to prevent rotational movement of said support and to index the latter in a selected one of a plurality of angular positions relative to said bracket.

References Cited by the Examiner

UNITED STATES PATENTS

| 448,028 | 3/91 | Hall. | |
|---|---|---|---|
| 1,220,069 | 3/17 | Carpdevila | 248—160 |
| 1,380,889 | 6/21 | Farriss | 248—160 |
| 2,475,193 | 7/49 | Miller | 248—42 |
| 2,548,351 | 4/51 | Coombs | 248—42 |
| 2,581,671 | 1/52 | Katter | 248—42 X |

FOREIGN PATENTS

| 694,124 | 7/53 | Great Britain. |
|---|---|---|

CLAUDE A. LE ROY, *Primary Examiner.*